US010404947B2

(12) United States Patent
Kitagawa

(10) Patent No.: US 10,404,947 B2
(45) Date of Patent: Sep. 3, 2019

(54) INFORMATION PROCESSING APPARATUS, INFORMATION PROCESSING METHOD, CAMERA SYSTEM, CONTROL METHOD FOR CAMERA SYSTEM, AND STORAGE MEDIUM

(71) Applicant: CANON KABUSHIKI KAISHA, Tokyo (JP)

(72) Inventor: Eiichiro Kitagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 442 days.

(21) Appl. No.: 14/187,569

(22) Filed: Feb. 24, 2014

(65) Prior Publication Data
US 2014/0267751 A1  Sep. 18, 2014

(30) Foreign Application Priority Data
Mar. 15, 2013 (JP) .................................. 2013-054137

(51) Int. Cl.
*H04N 7/18* (2006.01)
*G08B 29/22* (2006.01)
*G08B 13/196* (2006.01)

(52) U.S. Cl.
CPC ....... *H04N 7/181* (2013.01); *G08B 13/19645* (2013.01); *G08B 29/22* (2013.01)

(58) Field of Classification Search
CPC ........ H04N 7/181; H04N 5/232; H04N 5/247; G08B 13/19645; G08B 13/19693
(Continued)

(56) References Cited

U.S. PATENT DOCUMENTS 6,737,970 B2   5/2004   Wuestefeld et al.
8,797,403 B2   8/2014   Suzuki et al.
(Continued)

FOREIGN PATENT DOCUMENTS

JP   2002-374522 A   12/2002
JP   2005-136557 A    5/2005
(Continued)

OTHER PUBLICATIONS

Journal of Network and Computer Applications; Institute of Computer and Engineering; Cheng Kung University; Tainan, Taiwan Dec. 17, 2011 (Year: 2011).*
(Continued)

*Primary Examiner* — William C Vaughn, Jr.
*Assistant Examiner* — Daniel Tekle
(74) *Attorney, Agent, or Firm* — Venable LLP

(57) ABSTRACT

An information processing apparatus comprising: an association unit configured to associate coordinates on a video captured by a first camera with coordinates on a video captured by a second camera based on specific positions specified in the video captured by the first camera and in the video captured by the second camera; an input unit configured to input position information for event detection by the first camera; and a determination unit configured to determine position information for event detection by the second camera based on the position information for the event detection by the first camera and on the association made by the association unit between the coordinates on the video captured by the first camera and the coordinates on the video captured by the second camera.

20 Claims, 11 Drawing Sheets

(58) Field of Classification Search
USPC .......................................................... 348/159
See application file for complete search history.

(56) References Cited

U.S. PATENT DOCUMENTS

| | | | |
|---|---|---|---|
| 9,384,642 B2 | 7/2016 | Suzuki et al. | |
| 2007/0035627 A1* | 2/2007 | Cleary | G08B 13/19608 348/159 |
| 2008/0018737 A1 | 1/2008 | Suzuki et al. | |
| 2008/0219509 A1* | 9/2008 | White | A63B 24/0003 382/107 |
| 2010/0246901 A1* | 9/2010 | Yang | B60R 1/00 382/107 |
| 2011/0157368 A1 | 6/2011 | Jo | |
| 2013/0162838 A1* | 6/2013 | Huang | G06T 7/0042 348/169 |
| 2014/0185877 A1 | 7/2014 | Suzuki et al. | |
| 2014/0267737 A1 | 9/2014 | Kitagawa | |

FOREIGN PATENT DOCUMENTS

| | | |
|---|---|---|
| JP | 2006-339733 A | 12/2006 |
| JP | 2008-016898 A | 1/2008 |
| JP | 2009-017179 A | 1/2009 |
| JP | 2010-161632 A | 7/2010 |
| WO | 98/42131 A1 | 9/1998 |

OTHER PUBLICATIONS

Office Action dated Feb. 3, 2017 in Japanese Patent Application No. 2013-054137.

U.S. Appl. No. 14/196,204, Eiichiro Kitagawa, filed Mar. 4, 2014, Pending.

Chao-Yang Lee, et al., "An efficient continuous tracking system in real-time surveillance application," Journal of Network and Computer Applications, vol. 35, Issue 3, May 2012, pp. 1067-1073.

* cited by examiner

INFORMATION PROCESSING APPARATUS, INFORMATION PROCESSING METHOD, CAMERA SYSTEM, CONTROL METHOD FOR CAMERA SYSTEM, AND STORAGE MEDIUM

BACKGROUND OF THE INVENTION

Field of the Invention

The present invention relates to an information processing apparatus for controlling the operations of a monitoring camera, an information processing method, a camera system, a control method for a camera system, and a storage medium.

Description of the Related Art

In the field of monitoring systems, a technique to detect a moving object in a video using a video analysis technique is known. Furthermore, a technique to enable constant capturing and recognition of a detected moving object is known as a moving object tracking technique.

Using the foregoing techniques, Japanese Patent Laid-Open No. 2002-374522 discloses a monitored region setting method for setting regions monitored by a plurality of installed monitoring cameras while checking videos of the monitoring cameras.

However, in the case where an intended region is monitored using a plurality of cameras with detection functions, such as functions for passage detection and intrusion detection, at different angles, angles of view, or zoom factors, conventional techniques require the effort to configure detection settings (a line segment for passage detection, a closed region for intrusion detection, and the like) for each individual camera.

For example, in the case of passage detection for detecting passage of a moving object across a predetermined detection line, it is necessary to set an appropriate detection line for each camera. On the other hand, in the case of intrusion detection for detecting intrusion of a moving object into a predetermined region, it is necessary to set, for each camera, a closed region that is considered as intrusion when the moving object enters the same.

In view of the above problem, the present invention provides a technique to, when monitoring a region using a plurality of cameras, reduce the effort expended in configuring detection settings for each individual camera.

SUMMARY OF THE INVENTION

According to one aspect of the present invention, there is provided an information processing apparatus comprising: an association unit configured to associate coordinates on a video captured by a first camera with coordinates on a video captured by a second camera based on specific positions specified in the video captured by the first camera and in the video captured by the second camera; an input unit configured to input position information for event detection by the first camera; and a determination unit configured to determine position information for event detection by the second camera based on the position information for the event detection by the first camera and on the association made by the association unit between the coordinates on the video captured by the first camera and the coordinates on the video captured by the second camera.

Further features of the present invention will become apparent from the following description of exemplary embodiments (with reference to the attached drawings).

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 7:
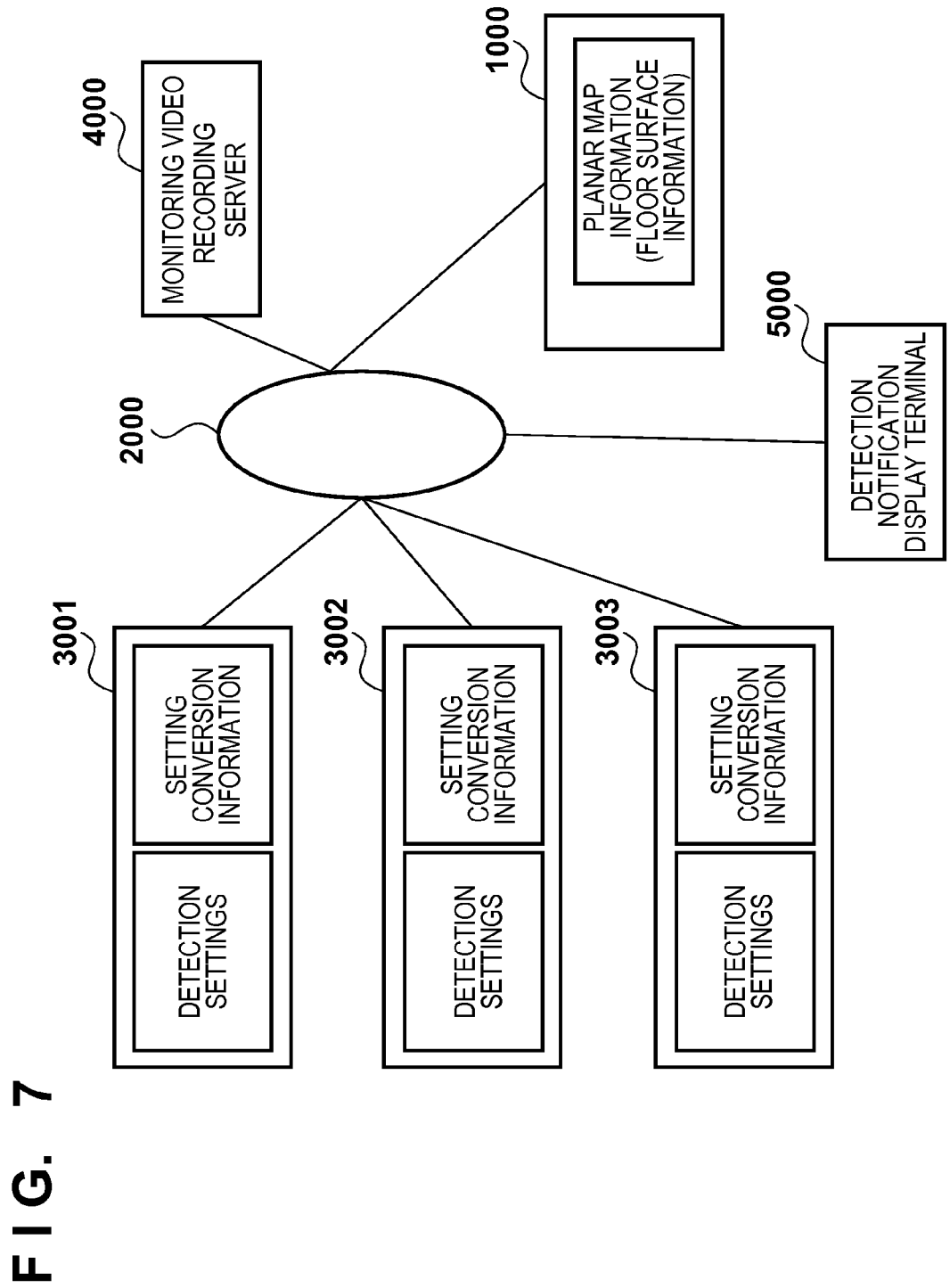
FIG. 7 shows an example of a configuration of a monitoring system according to one embodiment of the present invention.

FIG. 7 shows an example of a configuration of a monitoring system according to the present embodiment. The monitoring system includes a detection setting terminal 1000, monitoring cameras 3001 to 3003, a monitoring video recording server 4000, and a detection notification display terminal 5000, which are connected via a network such as a LAN (local area network) 2000.

The detection setting terminal 1000 configures various types of detection settings, such as setting related to moving object detection functions of monitoring cameras, setting of a type of detection performed by the monitoring cameras (passage detection, intrusion detection, and the like), setting of a detection line segment for detecting passage in the case of passage detection, and setting of a closed region for detecting intrusion in the case of intrusion detection. A user configures detection settings via a touchscreen operation while viewing a capture screen displayed on the detection setting terminal 1000. The detection setting terminal 1000 functions as an information processing apparatus that controls a plurality of monitoring cameras monitoring predetermined regions.

The monitoring cameras 3001 to 3003 have a moving object detection function and a passage detection function. The monitoring cameras 3001 to 3003 transmit monitoring videos that have been captured to the monitoring video recording server 4000 via the LAN 2000. The monitoring cameras 3001 to 3003 are also connected to the detection setting terminal 1000 via the LAN 2000, receive detection settings from the detection setting terminal 1000, and store therein the received detection settings. Furthermore, at the time of installation of the monitoring cameras 3001 to 3003, they receive, from the detection setting terminal 1000, detection setting conversion information determined by angles of view of the cameras, zoom settings of the cameras, and positions and angles at which the cameras are installed, and also store therein the received detection setting conversion information. The monitoring video recording server 4000 receives monitoring videos in a compressed state from the monitoring cameras 3001 to 3003, and records the received monitoring videos in a hard disk drive. The detection notification display terminal 5000 receives detection notifications from the monitoring cameras 3001 to 3003, and displays camera videos with the result of detection superimposed thereon. While it is assumed in the present embodiment that the detection notification display terminal 5000 is separate from the detection setting terminal 1000, they may be configured as the same apparatus.

Figure 1:
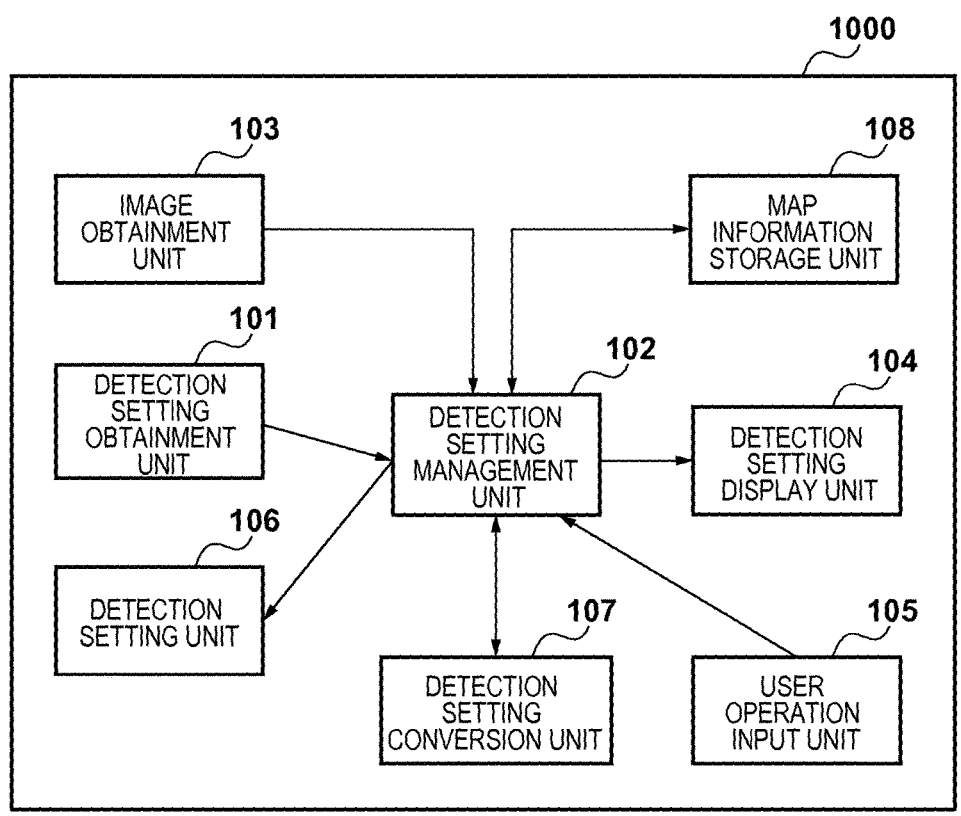
FIG. 1 shows a block configuration of a detection setting terminal 1000 (information processing apparatus) according to one embodiment of the present invention.

FIG. 1 shows a block configuration of the detection setting terminal 1000 in the monitoring system according to one embodiment of the present invention. The detection setting terminal 1000 includes a detection setting obtainment unit 101, a detection setting management unit 102, an image obtainment unit 103, a detection setting display unit 104, a user operation input unit 105, a detection setting unit 106, a detection setting conversion unit 107, and a map information storage unit 108.

The detection setting obtainment unit 101 obtains detection settings and detection setting conversion information set in the monitoring cameras from the monitoring cameras. The detection setting obtainment unit 101 is connected to the monitoring cameras via the LAN 2000, and can obtain the detection settings and the detection setting conversion information set in the monitoring cameras in accordance with a predetermined setting information obtainment protocol.

The detection setting management unit 102 manages the detection settings and the detection setting conversion information obtained from the monitoring cameras, and newly updates the detection settings in accordance with user input.

The image obtainment unit 103 obtains captured images from the monitoring cameras. More specifically, it obtains compressed video data from the monitoring cameras via the LAN 2000, similarly to the detection setting obtainment unit 101.

The detection setting display unit 104 displays, on a screen, the videos obtained from the monitoring cameras with the detection settings superimposed thereon. In the present embodiment, the detection setting display unit 104 is a liquid crystal monitor for display.

The user operation input unit 105 accepts user input for setting detection settings. In the present embodiment, the user operation input unit 105 is described as, but not limited to, a touchscreen that is arranged to overlie the liquid crystal monitor.

The detection setting unit 106 sets generated detection settings for the monitoring cameras. It has functions of connecting to the monitoring cameras via the LAN 2000, similarly to the image obtainment unit 103 and the detection setting obtainment unit 101, and of setting detection settings for the monitoring cameras in accordance with a predetermined setting protocol.

The detection setting conversion unit 107 executes coordinate conversion between: detection settings obtained from the monitoring cameras and detection settings set for the monitoring cameras; and detection settings on a two-dimensional plane. For example, it executes coordinate conversion between coordinates on a planar map and coordinates on videos captured by the monitoring cameras in relation to a detection line set for passage detection.

The map information storage unit 108 stores planar map information. The planar map will be described later in greater detail with reference to FIG. 5.

Figure 2A:
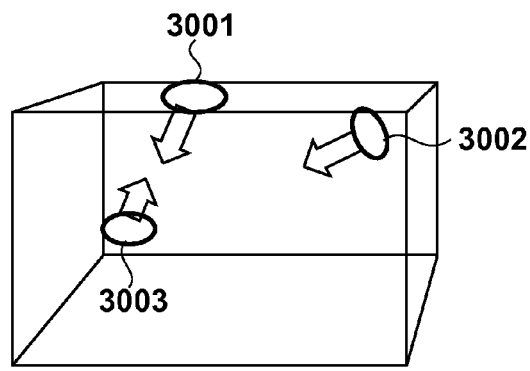
FIGS. 2A to 2C exemplarily show a plurality of monitoring cameras that are installed in a monitored space in one embodiment of the present invention.
Figure 2B:
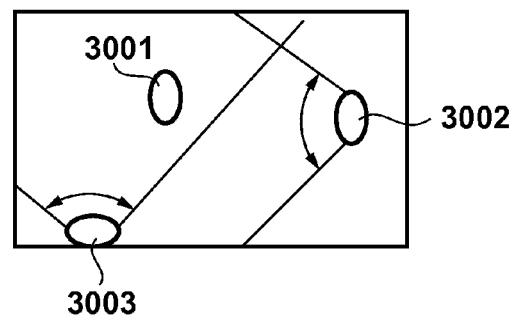
Figure 2C:
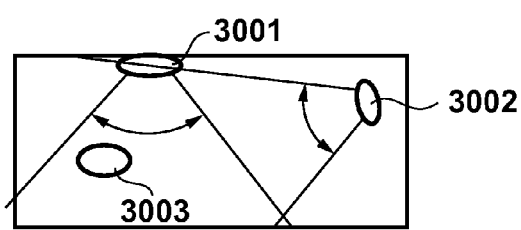

A description is now given of the operations of the above-described monitoring system. FIG. 2A is a cubic diagram showing the three monitoring cameras 3001 to 3003 installed in a monitored space. FIG. 2B is a plan view showing this monitored space as viewed from above, and FIG. 2C is a lateral view showing this monitored space as viewed laterally.

The monitoring camera 3001 is installed so as to face the direction of a door to some degree with a passageway situated substantially therebelow, and the monitoring camera 3002 is installed so as to capture the direction of the door from a rear side of the passageway at a shallow oblique angle. The monitoring camera 3003 is installed to capture people who pass by the door from a lateral direction. Regions included in capturing ranges of the monitoring cameras 3001 to 3003 overlap at least partially.

Figure 3A:
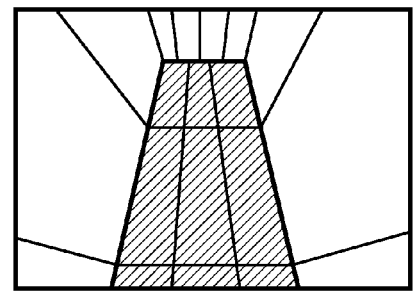
FIGS. 3A to 3C show examples of videos captured by monitoring cameras 3001 to 3003 according to one embodiment of the present invention.
Figure 3B:
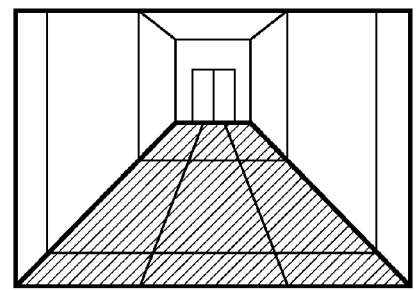
Figure 3C:
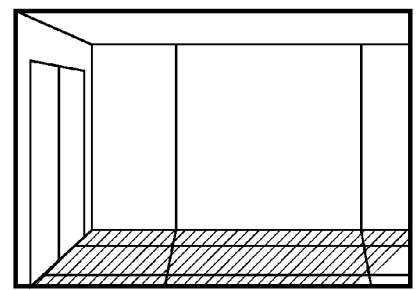

FIG. 3A shows an example of a video captured by the monitoring camera 3001. A hatched trapezoidal portion shown at the center of FIG. 3A is a floor surface of the passageway, and portions on the left and right of the trapezoidal portion are wall surfaces of the passageway. A portion above the trapezoidal portion is a part of the door at the front. Similarly, FIG. 3B shows an example of a video captured by the monitoring camera 3002, and FIG. 3C shows an example of a video captured by the monitoring camera 3003.

Figure 5:
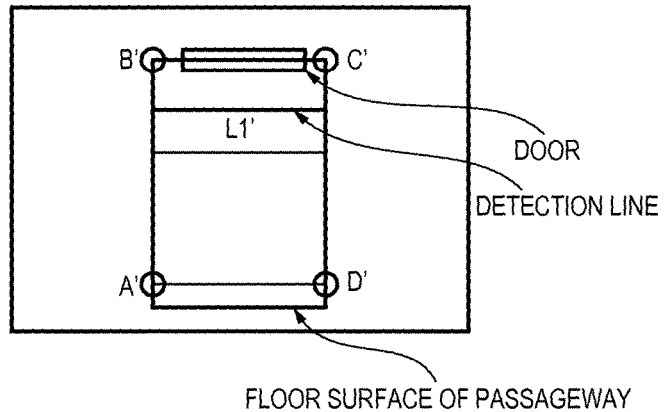
FIG. 5 shows representation of a monitored space according to one embodiment of the present invention in the form of a planar map.

FIG. 5 shows representation of the monitored space shown in FIG. 2A as viewed from above in the form of a planar map. This planar map can be obtained from a design drawing of a building or by measurement using a tape measure, and mainly shows information of objects that are not intended to be monitored, such as the floor surface, walls, and door.

Figure 4:
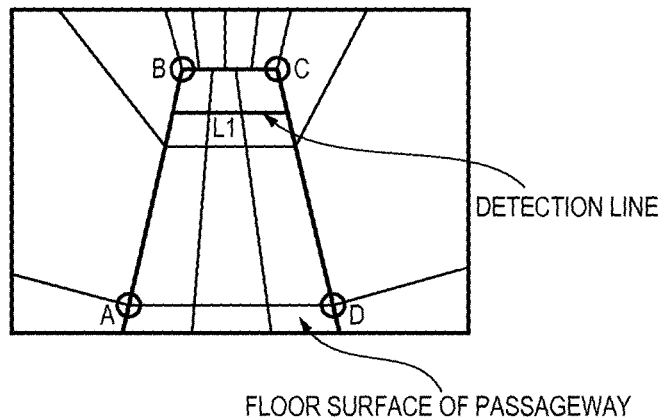
FIG. 4 shows an example of a video captured by the monitoring camera 3001 according to one embodiment of the present invention.

The operations of the detection setting conversion unit 107 shown in FIG. 1 will now be described with reference to FIGS. 4, 5, and the like. FIG. 4 shows a captured image obtained from the monitoring camera 3001. In order to convert a passage detection line L1 drawn on the floor surface of FIG. 4 into a passage detection line L1' on the planar map of FIG. 5, it is necessary to obtain a corresponding relationship between arbitrary points on the floor surface of FIG. 4 and points on the floor surface on the planar map of FIG. 5. As this corresponding relationship is determined by a perspective projection conversion, points on the floor surface can be interconverted by obtaining points on the planar map of FIG. 5 to which four points A, B, C, D of FIG. 4 correspond. In the case where a wide-angle lens is used as the camera lens, distortion of a peripheral vision is prominent, and therefore distortion correction for reducing the influence of such distortion is executed. In this case, the perspective projection conversion is executed after correcting the lens distortion.

The monitoring cameras 3001, 3002 and 3003 capture videos in the state where the four points A, B, C, D have been marked on the actual floor surface as indexes. The image obtainment unit 103 obtains the video of the monitoring camera 3001, and the detection setting display unit 104 displays the video. The marked points A, B, C, D on the camera video displayed on a setting screen are selected through a user operation on the screen; as a result, coordinates of these four points on the screen are obtained.

Next, positions of these four points on the corresponding planar map of FIG. 5 are obtained. As points B and C are marked at the corners of the passageway, it is evident that they respectively correspond to points B' and C' on the planar map. The actual distance between the marked points A and B is measured using a tape measure. Once the actually-measured distance has been input through the user operation input unit 105, the position of point A' is obtained by converting the actually-measured distance into a distance on the planar map in accordance with a scale of the planar map. Similarly, the position of point D' on the planar map is obtained by actually measuring the distance between points C and D on the floor surface and inputting the actually-measured distance through the user operation input unit 105.

In the above-described method, correspondence between four points A, B, C, D on the image captured by the monitoring camera 3001 and four points A', B', C', D' on the planar map is obtained, thereby making it possible to obtain projection conversion between points on the floor surface captured by the monitoring camera 3001 and points on the planar map, as well as inverse conversion therebetween, as conversion parameters.

Figure 6:
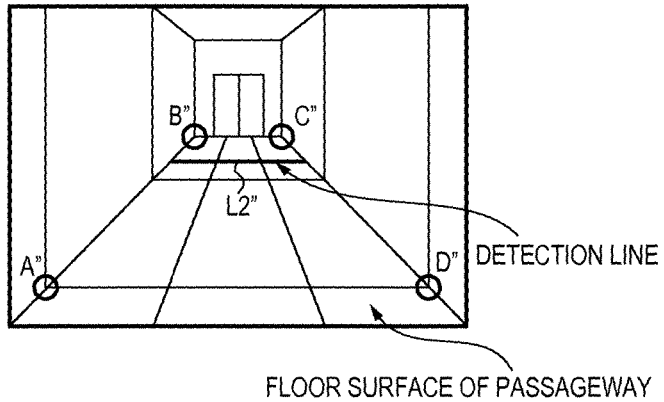
FIG. 6 shows an example of a video captured by the monitoring camera 3002 according to one embodiment of the present invention.

At the time of installation of the monitoring camera 3001, the aforementioned measurement is carried out, and the obtained conversion parameters are stored in the monitoring camera 3001 as setting conversion information. Similarly, with regard to the monitoring camera 3002, a capture screen shown in FIG. 6 is displayed, and four marked points A", B", C", D" are selected on the screen. In this case, the following correspondence is similarly obtained: points B" and C" respectively correspond to points B' and C', and points A" and D" respectively correspond to points A' and D'. Once a corresponding relationship between the four points has been obtained, projection conversion between points on the floor surface captured by the monitoring camera 3002 and points on the planar map, as well as inverse conversion therebetween, can be obtained as conversion parameters. The obtained conversion parameters are stored in the monitoring camera 3002 as setting conversion information.

Similarly, with regard to the monitoring camera 3003, projection conversion and inverse conversion are obtained as conversion parameters from a corresponding relationship between the four points on the floor surface, and the conversion parameters are stored in the monitoring camera 3003 as setting conversion information. With the setting conversion information obtained in the above manner, a corresponding relationship between the monitoring cameras can be identified. Note that it is sufficient to execute the aforementioned processing only once at the time of installation of the monitoring cameras, and it is not necessary to carry out the measurement again unless the angles of view and orientations of the monitoring cameras change.

Figure 8:
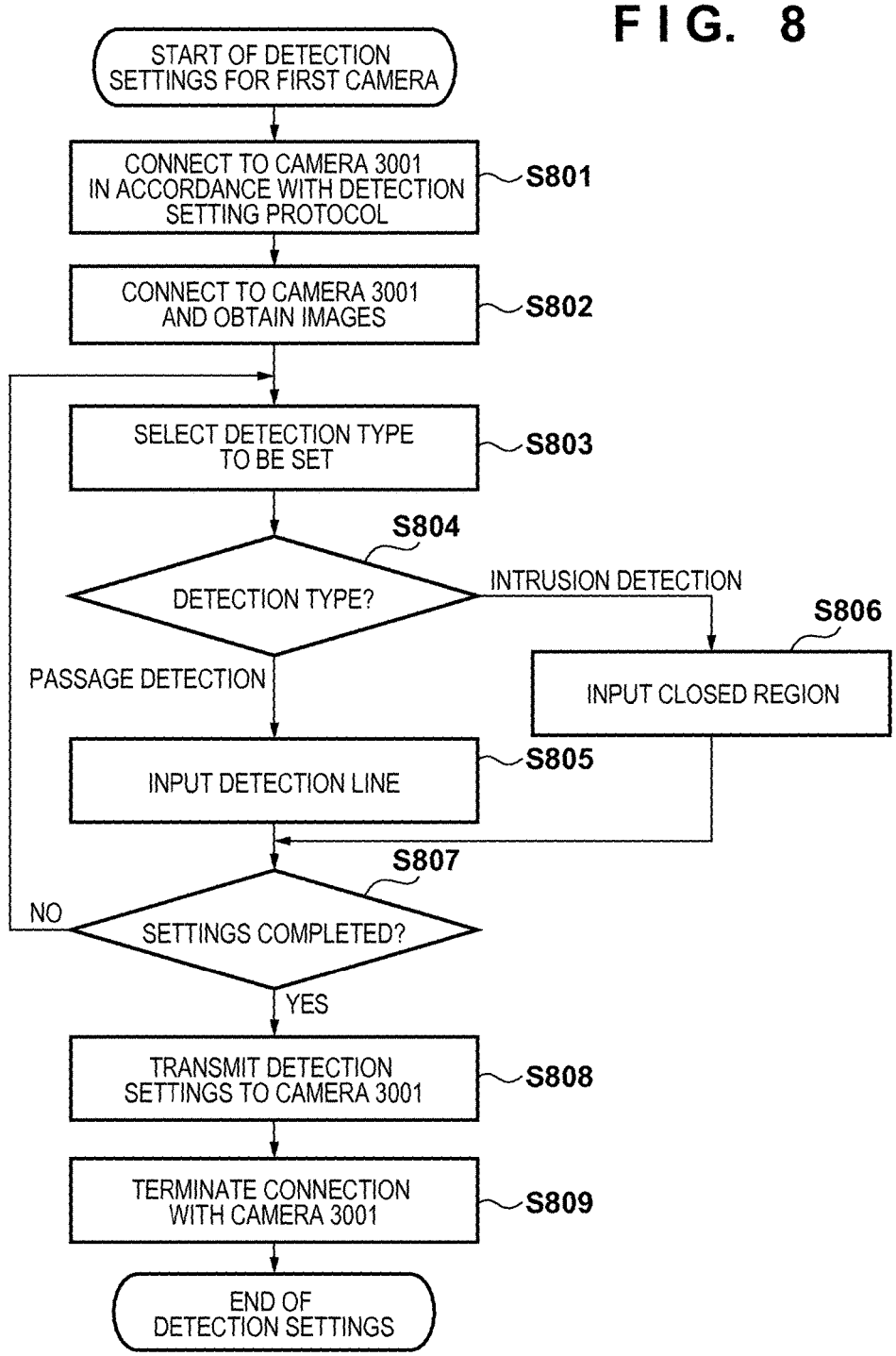
FIG. 8 is a flowchart showing a procedure of processing for configuring a detection setting for the first monitoring camera in one embodiment of the present invention.

The following describes the operations executed by the detection setting terminal 1000 to set detection settings for the monitoring cameras. First, a description is given of a method for setting detection settings for the first camera, that is to say, the monitoring camera 3001 with reference to a flowchart of FIG. 8. First, the user selects settings for the monitoring camera 3001 by operating the detection setting terminal 1000.

In step S801, the detection setting management unit 102 connects to the monitoring camera 3001 in accordance with a setting protocol. In step S802, the image obtainment unit 103 connects to the monitoring camera 3001 in accordance with a video obtainment protocol and obtains images from the monitoring camera 3001.

In step S803, the user selects a detection type to be set by operating the user operation input unit 105 (for example, a touchscreen).

In step S804, the detection setting management unit 102 determines the detection type selected in step S803. If the detection type selected in step S803 is passage detection, processing proceeds to step S805. On the other hand, if the detection type selected in step S803 is intrusion detection, processing proceeds to step S806.

In step S805, through an operation on the user operation input unit 105, the user inputs a detection line by selecting a start point and an end point of a line on the floor surface targeted for detection while viewing a captured video displayed on a screen. Consequently, in accordance with the user operation, the detection line is rendered and superimposed on the video of the monitoring camera on the screen. In the example of the screen shown in FIG. 4, the passage detection line L1 is displayed.

In step S806, through an operation on the user operation input unit 105, the user inputs a closed region for intrusion detection on the floor surface while viewing the captured video displayed on the screen. Consequently, in accordance with the user operation, the closed region is rendered and superimposed on the video of the monitoring camera on the screen.

In step S807, the detection setting management unit 102 determines whether or not detection settings for the target monitoring camera (in the present example, the monitoring camera 3001) have been completed. If detection settings have not been completed (NO of step S807), processing returns to step S803, and input of detection settings is repeated. On the other hand, if detection settings have been completed (YES of step S807), processing proceeds to step S808.

In step S808, the detection setting unit 106 transmits the detection settings to the monitoring camera 3001. In the present embodiment, passage detection is input as a detection type, start coordinates and end coordinates of the passage detection line L1 are input as a site targeted for detection, and these detection settings are transmitted to the monitoring camera 3001 via the detection setting unit 106. Note that these coordinates are plotted on a capture screen of the monitoring camera 3001.

In step S809, once the settings for the monitoring camera 3001 have been completed, connection with the monitoring camera 3001 is terminated, and detection setting processing is ended.

Figure 9:
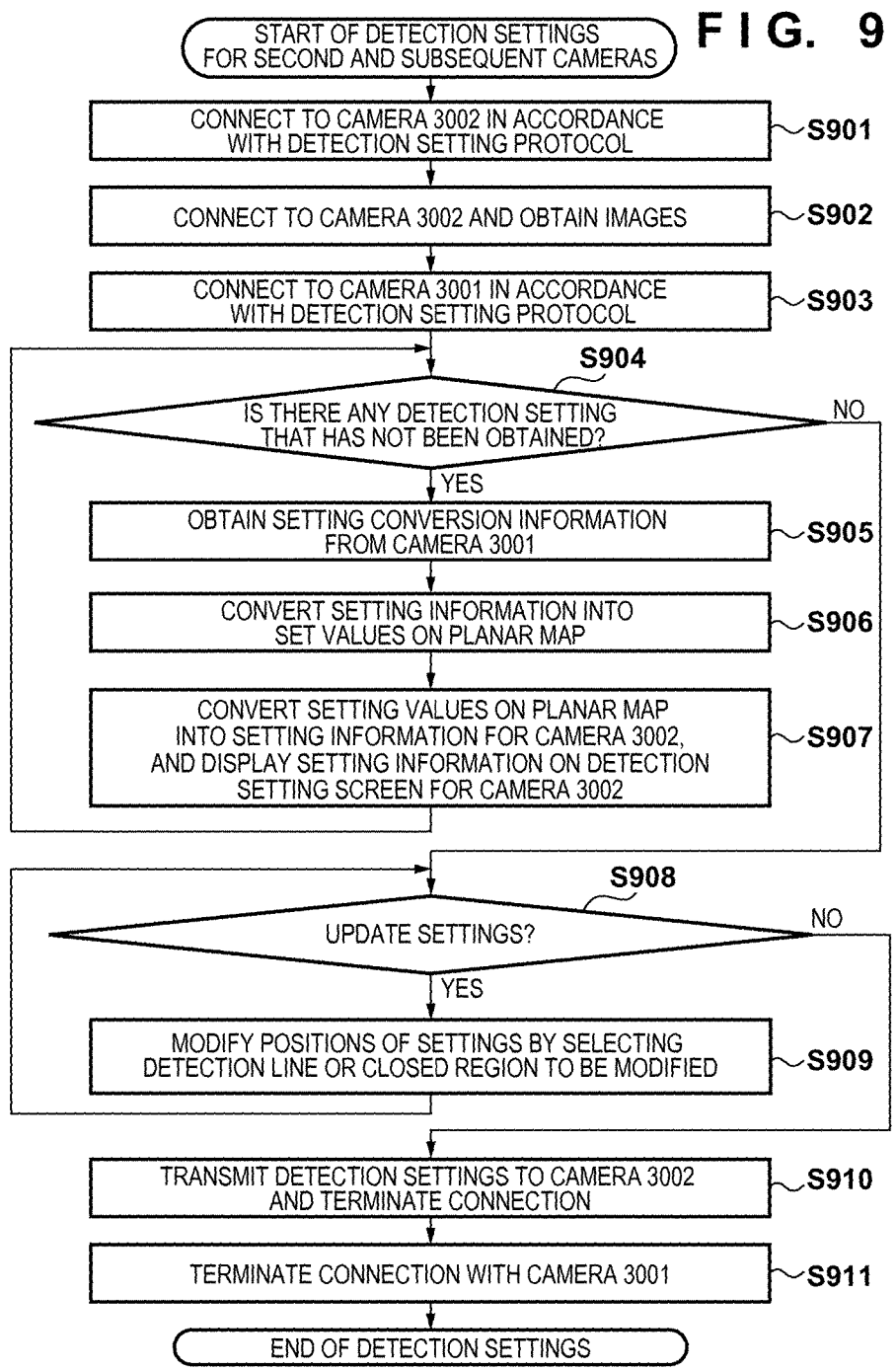
FIG. 9 is a flowchart showing a procedure of processing for configuring a detection setting for the second and subsequent monitoring cameras in one embodiment of the present invention.

The following describes a method for setting detection settings for the second and subsequent cameras with reference to a flowchart of FIG. 9.

The user selects settings for the second camera, e.g. the monitoring camera 3002 (second monitoring camera) by operating the detection setting terminal 1000. It will be assumed that the monitoring camera 3001 is the first monitoring camera.

Figure 10A:
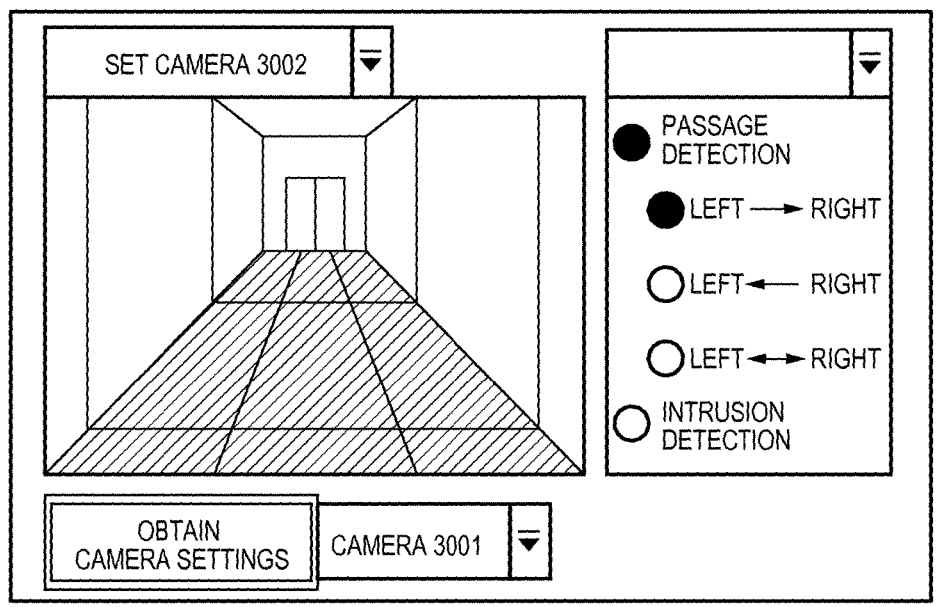
FIGS. 10A and 10B show examples of screens displayed by a setting terminal when configuring a detection setting for the monitoring camera 3002 in one embodiment of the present invention.

In step S901, the detection setting management unit 102 connects to the monitoring camera 3002 in accordance with a setting protocol. In step S902, the image obtainment unit 103 connects to the monitoring camera 3002 in accordance with a video obtainment protocol and obtains images from the monitoring camera 3002. FIG. 10A shows an example of a screen displayed by the detection setting terminal 1000. In this example, the monitoring camera 3002 is selected as a camera targeted for detection settings, and a video of the monitoring camera 3002 is displayed on the screen.

In step S903, the detection setting management unit 102 connects to the monitoring camera 3001 in accordance with a setting protocol. In step S904, the detection setting management unit 102 checks setting information of the monitoring camera 3001 and determines whether or not there is any detection setting that has not been obtained yet. If there is any detection setting that has not been obtained yet in the monitoring camera 3001 (YES of step S904), processing proceeds to step S905.

In step S905, the detection setting obtainment unit 101 obtains setting information from the monitoring camera 3001. In step S906, the detection setting conversion unit 107 converts the setting information of the monitoring camera 3001 obtained in step S905 into detection line setting values normalized on a planar map.

In step S907, the detection setting conversion unit 107 converts the normalized setting values on the planar map into setting information for the monitoring camera 3002 (second monitoring camera), and superimposes the resultant setting information on an image displayed on a detection setting screen for the monitoring camera 3002.

Figure 10B:
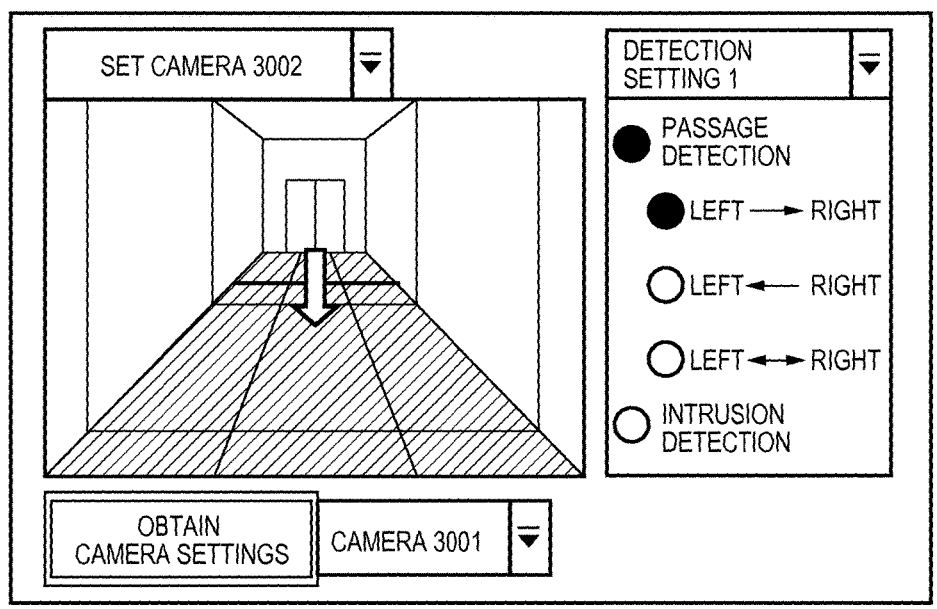

In this way, based on information showing correspondence between coordinates on a video of the monitoring camera 3001 and coordinates on a video of the monitoring camera 3002 (setting conversion information of conversion from the monitoring camera 3001 to the planar map, and setting conversion information of conversion from the planar map to the monitoring camera 3002), detection settings for the monitoring camera 3001 are converted into detection settings for the monitoring camera 3002, and then displayed together with a video. In the example of FIG. 6, a passage detection line L2 is displayed. FIG. 10B shows an example of a screen displayed by the detection setting terminal 1000. If the "OBTAIN CAMERA SETTINGS" button is pressed while the monitoring camera 3001 is selected as a camera from which detection settings are to be obtained, passage detection settings for the monitoring camera 3001 are superimposed on the displayed video of the monitoring camera 3002.

If the user wishes to modify detection settings that have been automatically generated (YES of step S908), the user modifies the detection settings through a user operation. On the other hand, if no further modification is applied to the settings (NO of step S908), processing proceeds to step S910.

In step S909, the detection line is modified by selecting an edge point of a tentative detection line and dragging the selected edge point on the screen using the user operation input unit 105. If the user applies no modification (NO of step S908), a detection line that has been automatically generated by the detection setting conversion unit 107 is used as-is.

In step S910, the detection setting unit 106 transmits detection line information set for the monitoring camera 3002 to the monitoring camera 3002, and accordingly configures detection settings for the monitoring camera 3002. The detection setting management unit 102 then terminates connection with the monitoring camera 3002.

Thereafter, in step S911, the detection setting management unit 102 terminates connection with the monitoring camera 3001, and ends processing. In the above manner, detection settings can be configured for a plurality of monitoring cameras.

As described above, detection setting information that has been set for one camera is displayed as default setting information when configuring detection settings for another monitoring camera; therefore, the detection settings can easily be configured with reference to the default setting information. As a result, detection settings for a plurality of cameras can be configured with ease.

The following describes the operations executed by a detection display terminal when passage detection is performed by the monitoring camera 3001 and information to that effect is notified while the user is viewing a video of the monitoring camera 3002.

Figure 12:
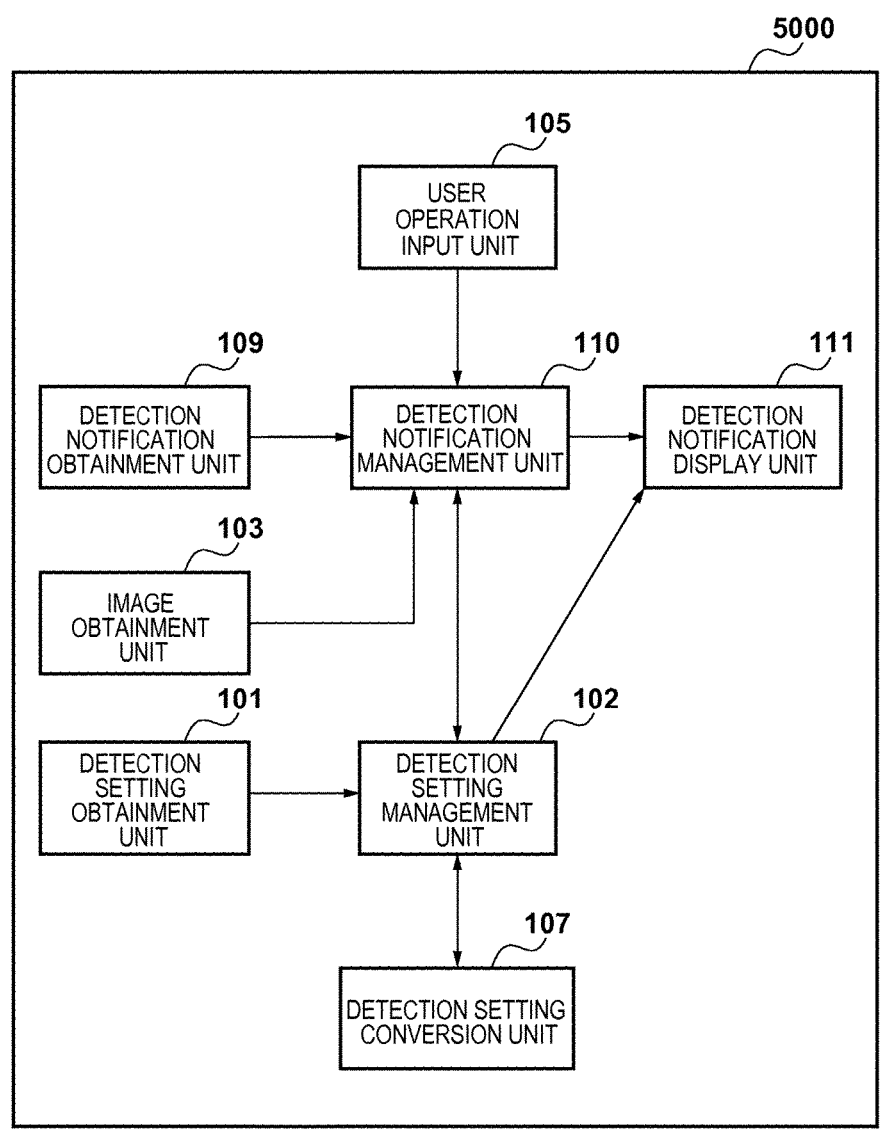
FIG. 12 shows a block configuration of a detection notification display terminal 5000 (display apparatus) according to one embodiment of the present invention.

FIG. 12 shows a block configuration of the detection notification display terminal 5000 according to one embodiment of the present invention. The detection notification display terminal 5000 includes a detection setting obtainment unit 101, a detection setting management unit 102, an image obtainment unit 103, a user operation input unit 105, and a detection setting conversion unit 107 similarly to the detection setting terminal 1000, and in addition to these constituent elements, further includes a detection notification obtainment unit 109, a detection notification management unit 110, and a detection notification display unit 111.

The detection notification obtainment unit 109 receives, from the monitoring cameras, notifications of passage detection and intrusion detection performed by the monitoring cameras. The detection notification management unit 110 manages detection notifications received from the plurality of cameras. The detection notification display unit 111 displays the results of detection notifications together with camera videos.

Figure 13:
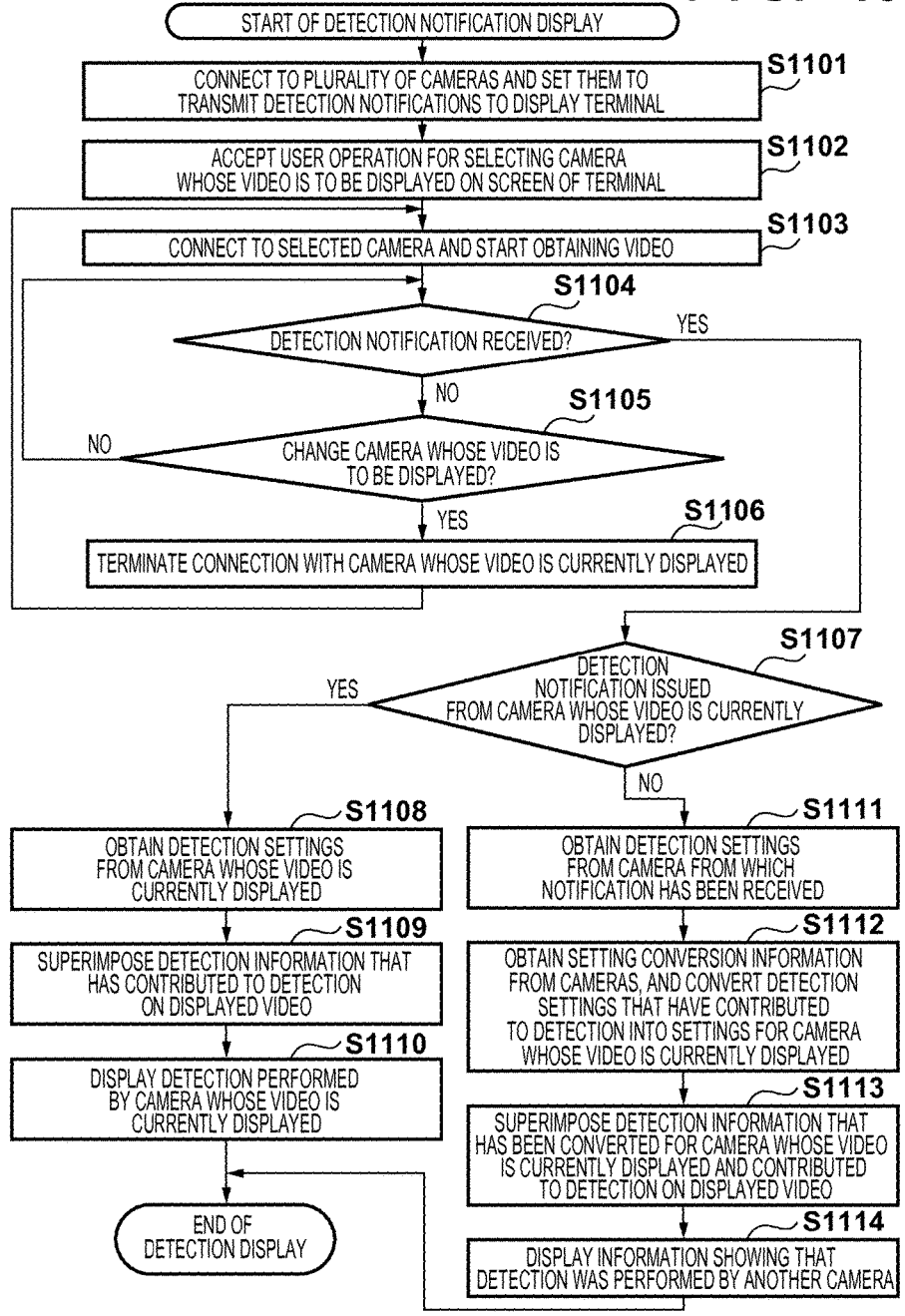
FIG. 13 is a flowchart showing a procedure of processing executed by the detection notification display terminal 5000 in one embodiment of the present invention.

A procedure of processing executed by the detection notification display terminal 5000 will now be described with reference to a flowchart of FIG. 13.

In step S1101, the detection notification obtainment unit 109 connects to the monitoring cameras 3001 to 3003 in the network in accordance with a detection notification setting protocol, and sets these monitoring cameras to transmit detection notifications when they perform passage detection or intrusion detection.

In step S1102, the user operation input unit 105 accepts a user operation for selecting a monitoring camera whose video is to be displayed on a screen of the detection notification display terminal 5000. It is assumed here that the user inputs a selection of the monitoring camera 3002 through a user operation, so that a video thereof is displayed on the screen of the detection notification display terminal 5000.

Figure 14:
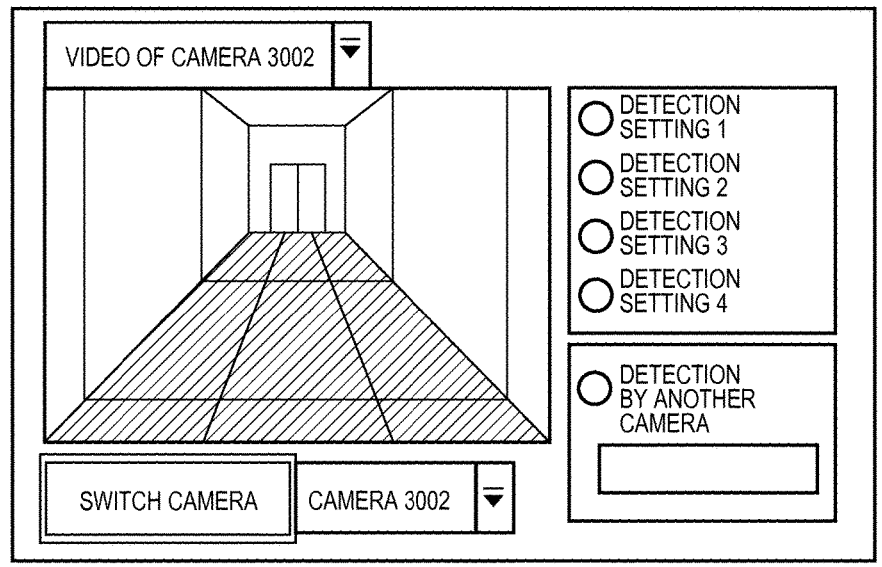
FIG. 14 shows an example of a screen of the detection notification display terminal 5000 displayed when switching a camera in one embodiment of the present invention.

In step S1103, the image obtainment unit 103 connects to the monitoring camera selected in step S1102 and starts obtaining the video thereof. It is assumed here that the image obtainment unit 103 connects to the monitoring camera 3002 and starts obtaining a video thereof. Then, the detection notification display unit 111 displays the video obtained from the monitoring camera 3002 on the screen of the detection notification display terminal 5000. FIG. 14 shows an example of a displayed screen. More specifically, the video obtained from the monitoring camera 3002 is displayed on the screen.

In step S1104, the detection notification obtainment unit 109 determines whether or not a detection notification has been received. If the detection notification has been received (YES of step S1104), processing proceeds to step S1107. On the other hand, if the detection notification has not been received (NO of step S1104), processing proceeds to step S1105.

In step S1105, the detection notification obtainment unit 109 determines whether or not to change the monitoring camera whose video is to be displayed. Note that whether or not to change the monitoring camera whose video is to be displayed can be determined based on whether or not the user has selected a monitoring camera from a drop-down menu and pressed the "SWITCH CAMERA" button as shown in FIG. 14. If it is determined to change the monitoring camera whose video is to be displayed (YES of step S1105), processing proceeds to step S1106. On the other hand, if it is determined not to change the monitoring camera whose video is to be displayed (NO of step S1105), processing returns to step S1104. If the detection notification has not been received (NO of step S1104) and the monitoring camera whose video is to be displayed is not changed (NO of step S1105), the received video is continuously displayed.

In step S1106, the image obtainment unit 103 terminates connection with the monitoring camera from which the video is currently received. Thereafter, processing returns to step S1103, in which the image obtainment unit 103 connects to the monitoring camera that has been selected as a result of the change, and newly starts obtaining a video thereof.

In step S1107, the detection notification management unit 110 determines whether or not the received detection notification has been issued from the monitoring camera whose video is currently displayed (in the present example, the monitoring camera 3002). If it is determined that the received detection notification has been issued from the monitoring camera whose video is currently displayed (YES of step S1107), processing proceeds to step S1108. On the other hand, if it is determined that the received detection notification has not been issued from the monitoring camera whose video is currently displayed (NO of step S1107), processing proceeds to step S1111.

In step S1108, the detection setting obtainment unit 101 obtains detection settings for the monitoring camera whose video is currently displayed (in the present example, the monitoring camera 3002) from that monitoring camera. In step S1109, the detection notification display unit 111 displays detection information that has been obtained in step S1108 and contributed to the detection together with the video. In step S1110, the detection notification display unit 111 displays the detection performed by the monitoring camera whose video is currently displayed.

Figure 15:
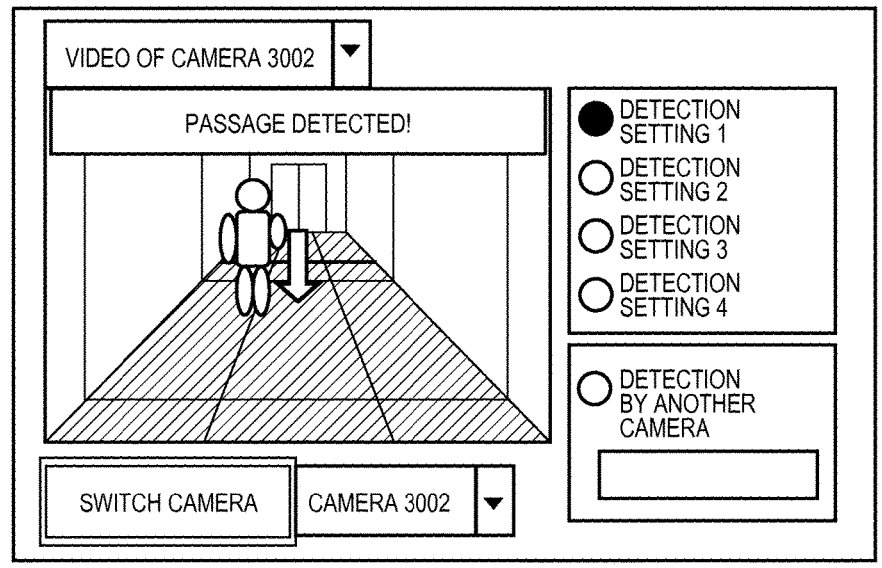
FIG. 15 shows an example of a screen of the detection notification display terminal 5000 displaying detection performed by another camera in one embodiment of the present invention.

FIG. 15 shows an example of a screen displayed in this instance. More specifically, a video of the monitoring camera 3002 is displayed on the screen, together with detection setting 1 as the detection information. Furthermore, a sentence "PASSAGE DETECTED!" is superimposed on the displayed video.

In step S1111, the detection setting obtainment unit 101 receives and hence obtains detection settings of the monitoring camera from which the detection notification has been received (for example, the monitoring camera 3001) from that monitoring camera.

In step S1112, the detection setting obtainment unit 101 obtains detection conversion information from the monitoring cameras 3001 and 3002. The detection setting conversion unit 107 also converts detection settings that have contributed to the detection into settings for the monitoring camera whose video is currently displayed based on the perspective projection conversion information.

In step S1113, the detection notification display unit 111 displays the detection settings converted for the monitoring camera whose video is currently displayed (in the present example, the monitoring camera 3002) together with the video thereof.

In step S1114, the detection notification display unit 111 displays, on the screen, information showing that the detection was performed by another monitoring camera (in the present example, the monitoring camera 3001).

Figure 11:
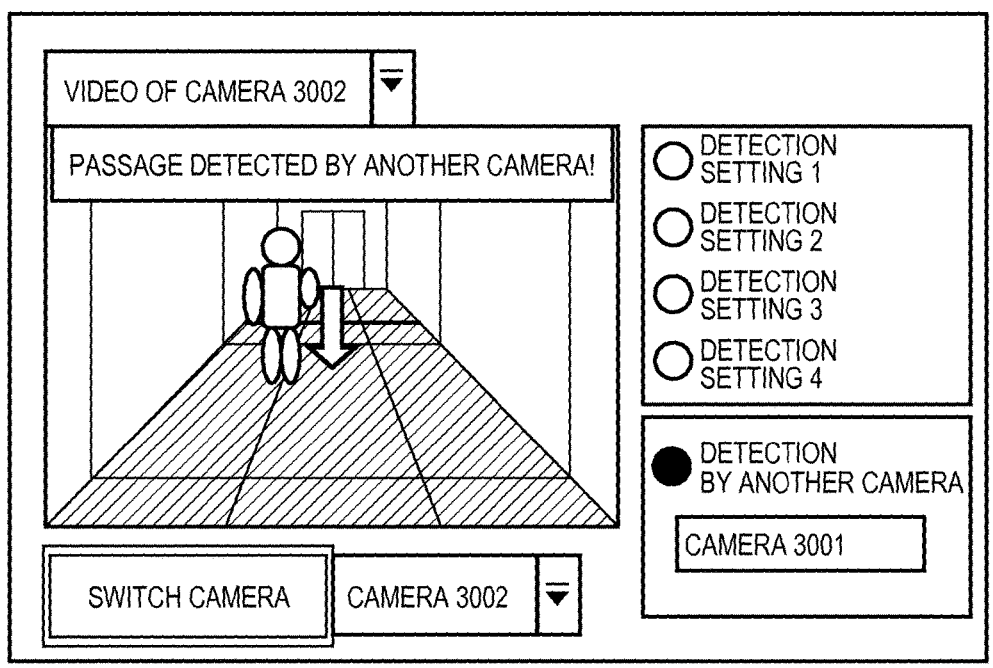
FIG. 11 shows an example of a screen displayed when a detection notification is received from the monitoring camera 3001 during display of a video of the monitoring camera 3002 in one embodiment of the present invention.

FIG. 11 shows an example of a screen of the detection notification display terminal 5000 displayed in this instance. More specifically, the video of the monitoring camera 3002 is displayed on the screen, and a sentence "PASSAGE DETECTED BY ANOTHER CAMERA!" is superimposed on the displayed video. The screen also shows that another camera is the monitoring camera 3001.

As an event detected by a certain camera is superimposed on a displayed video of another camera in the above manner, the result of detection can easily be checked even while the video of another camera is being viewed.

Second Embodiment

In the first embodiment, regions captured by a plurality of cameras overlap one another, and detection settings are configured with respect to the overlapping regions. However, the present invention is not limited in this way. For example, in the case where cameras are installed in similar positions on different but identically-designed floors of an office building such that each camera detects passage of people who come in and out of a door, the identical design allows mapping on the same planar map, and therefore the present invention can be applied.

Furthermore, while detection settings are configured for the second camera continuously after the configuration of detection settings for the first camera in the first embodiment, a time interval may be set between the initial configuration of detection settings for the first camera and the configuration of detection settings for the next camera. In this case, if information of the first camera for which detection settings have already been configured is not left in a setting terminal, a camera that satisfies the following conditions is searched for: a capturing range overlaps, and a detection line is set in an overlapping region. If a camera that satisfies these conditions is found, it is sufficient to obtain detection line information of the camera and then display the detection line information on a setting screen of a camera for which a detection line is to be set.

While the setting conversion information provided to the detection setting conversion unit 107 is stored in the cameras in the first embodiment, this information is not limited to being stored in the cameras. For example, the setting conversion information may be stored in the monitoring video recording server 4000 connected to the network, and the setting terminal may obtain the setting conversion information from the monitoring video recording server 4000. Also, the setting conversion information of all installed cameras may be prestored in the setting terminal.

While the setting conversion information is generated by obtaining a corresponding relationship between four points on images captured by the cameras and four points on a planar map in the first embodiment, the setting conversion information is not limited to being generated in this way. For example, the setting conversion information may be obtained from angle-of-view information, which is determined by lens characteristics of the cameras and settings of zoom positions of the cameras, and from information of the positions, heights and angles at which the cameras are installed.

While it is assumed that all cameras have a detection function in the first embodiment, the present invention is not limited to this configuration. For example, one wide-angle camera may capture an extensive panoramic view, and videos of four divided sections of the extensive panoramic view may be respectively captured by four telescopic cameras with a passage detection function. In this case, the following configuration may be adopted: the wide-angle camera does not store detection settings shown in FIG. 7 but stores setting conversion information therein; detection settings for the telescopic cameras are converted into settings for the wide-angle cameras using the setting conversion information received from the wide-angle camera; and the detection settings for the telescopic cameras that have contributed to the detection are superimposed on a displayed video of the wide-angle camera.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-054137 filed on Mar. 15, 2013, which is hereby incorporated by reference herein in its entirety.

What is claimed is:

1. An information processing apparatus comprising:
a memory configured to store a program; and
a processor operatively coupled to the memory and configured to execute the program stored in the memory, wherein the processor:
(1) associates coordinates on a video captured by a first camera with coordinates on a video captured by a second camera;
(2) obtains, according to a user operation to designate a specific position within the field of view of the video captured by the first camera to be applied to an event detection in the video captured by the first camera, first position information of the specific position in the video captured by the first camera, wherein the specific position designated by the user operation is (a) a line segment for passage detection as the event detection or (b) a closed region for intrusion detection as the event detection; and
(3) sets for the second camera, based on (a) the obtained first position information of the specific position designated by the user operation in the video captured by the first camera and (b) the association between the coordinates on the video captured by the first camera and the coordinates on the video captured by the second camera, second position information of a specific position to be applied to an event detection in the video captured by the second camera.

2. The information processing apparatus according to claim 1, wherein the processor further:
displays an image based on the second position information determined in the determination on the video captured by the second camera; and
accepts a user input for modifying the determined second position information.

3. The information processing apparatus according to claim 1, wherein the processor further:
transmits the second position information of the specific position in the video captured by the second camera to the second camera in accordance with the determination.

4. The information processing apparatus according to claim 1, wherein the processor further:
associates the coordinates on the video captured by the first camera with the coordinates on the video captured by the second camera based on specific positions designated by a user in the video captured by the first camera and in the video captured by the second camera.

5. The information processing apparatus according to claim 1, wherein the processor further:
detects a specific object from the captured videos; and
associates the coordinates on the video captured by the first camera with the coordinates on the video captured by the second camera based on positions of the specific object detected in the video captured by the first camera and in the video captured by the second camera.

6. The information processing apparatus according to claim 1, wherein the processor further:
associates the coordinates on the video captured by the first camera with the coordinates on the video captured by the second camera based on specific positions specified in overlapping regions in areas captured by the first camera and the second camera in the video captured by the first camera and in the video captured by the second camera.

7. The information processing apparatus according to claim 1, wherein the processor further:

executes first association processing for associating the coordinates on the video captured by the first camera with coordinates on a predetermined map, and second association processing for associating the coordinates on the video captured by the second camera with the coordinates on the predetermined map; and converts coordinates corresponding to the first position information of the specific position in the video captured by the first camera into coordinates on the predetermined map using a result of the first association processing, and determines coordinates corresponding to the second position information of the specific position in the video captured by the second camera using the coordinates on the predetermined map and a result of the second association processing.

8. The information processing apparatus according to claim 1, wherein when the first camera has detected an event based on the first position information of the specific position in the video captured by the first camera, an image corresponding to the event is displayed on the video captured by the second camera at a position corresponding to a position in the video captured by the first camera at which the event has been detected.

9. The information processing apparatus according to claim 1, wherein the obtained first position information of the specific position designated by the user operation in the video captured by the first camera is set for the first camera so that the first camera detects the event occurring at the specific position.

10. The information processing apparatus according to claim 1, wherein the specific position in the video captured by the first camera and the specific position in the video captured by the second camera correspond to the same position in a monitored space, and wherein the monitored space includes capturing ranges of the first camera and the second camera, and the same position is included in each of the capturing ranges.

11. The information processing apparatus according the claim 1, wherein in the event detection, an event corresponding to an object at the specific position is to be detected and an event corresponding to an object at a position different from the specific position is not to be detected.

12. An information processing method implemented by an information processing apparatus using a processor, operatively coupled to a memory, to perform steps comprising:

associating coordinates on a video captured by a first camera with coordinates on a video captured by a second camera;

obtaining, according to a user operation to designate a specific position within the field of view of the video captured by the first camera to be applied to an event detection in the video captured by the first camera, first position information of the specific position in the video captured by the first camera, wherein the specific position designated by the user operation is (a) a line segment for passage detection as the event detection or (b) a closed region for intrusion detection as the event detection; and setting for the second camera, based on (a) the obtained first position information of the specific position designated by the user operation in the video captured by the first camera and (b) the association between the coordinates on the video captured by the first camera and the coordinates on the video captured by the second camera, second position information of a specific position to be applied to an event detection in the video captured by the second camera.

13. The information processing method according to claim 12, further comprising steps of:

displaying an image based on the second position information determined on the video captured by the second camera; and accepting a user input for modifying the determined second position information.

14. The information processing method according to claim 12, further comprising a step of:

transmitting the second position information of the specific position in the video captured by the second camera to the second camera in accordance with the determination.

15. The information processing method according to claim 12, further comprising a step of:

detecting a specific object from the captured videos, wherein the coordinates on the video captured by the first camera are associated with the coordinates on the video captured by the second camera based on positions of the detected object in the video captured by the first camera and in the video captured by the second camera.

16. The information processing method according to claim 12, wherein, in the association, first association processing is executed for associating the coordinates on the video captured by the first camera with coordinates on a predetermined map, and second association processing is executed for associating the coordinates on the video captured by the second camera with the coordinates on the predetermined map, and wherein, in the determination, coordinates corresponding to the first position information of the specific position in the video captured by the first camera are converted into coordinates on the predetermined map using a result of the first association processing, and coordinates corresponding to the second position information of the specific position in the video captured by the second camera are determined using the coordinates on the predetermined map and a result of the second association processing.

17. The information processing method according to claim 12, wherein, when the first camera has detected an event based on the first position information of the specific position in the video captured by the first camera, an image corresponding to the event is displayed on the video captured by the second camera at a position corresponding to a position in the video captured by the first camera at which the event has been detected.

18. A non-transitory computer-readable storage medium storing a computer program that is executable by a computer, the computer program comprising steps of:

associating coordinates on a video captured by a first camera with coordinates on a video captured by a second camera;

obtaining, according to a user operation to designate a specific position within the field of view of the video captured by the first camera to be applied to an event detection in the video captured by the first camera, first position information of the specific position in the video captured by the first camera, wherein the specific position designated by the user operation is (a) a line segment for passage detection as the event detection or (b) a closed region for intrusion detection as the event detection; and setting for the second camera, based on (a) the obtained first position information of the specific position designated by the user operation in the video captured by the first camera and (b) the association between the coordinates on the video captured by the first camera and the coordinates on the video captured by the second camera, second position information of a specific position to be applied to an event detection in the video captured by the second camera.

19. A camera system including a plurality of cameras, the camera system comprising:
 a processor operatively coupled to a memory, wherein the processor:
 (1) associates coordinates on a video captured by a first camera with coordinates on a video captured by a second camera;
 (2) obtains, according to a user operation to designate a specific position within the field of view of the video captured by the first camera to be applied to an event detection in the video captured by the first camera, first position information of the specific position in the video captured by the first camera, wherein the specific position designated by the user operation is (a) a line segment for passage detection as the event detection or (b) a closed region for intrusion detection as the event detection; and
 (3) sets for the second camera, based on (a) the obtained first position information of the specific position designated by the user operation in the video captured by the first camera and (b) the association between the coordinates on the video captured by the first camera and the coordinates on the video captured by the second camera, second position information of a specific position to be applied to an event detection in the video captured by the second camera.

20. A control method for a camera system including a plurality of cameras, the camera system using a processor, operatively coupled to a memory, to perform steps comprising:
 associating coordinates on a video captured by a first camera with coordinates on a video captured by a second camera;
 obtaining, according to a user operation to designate a specific position within the field of view of the video captured by the first camera to be applied to an event detection in the video captured by the first camera, first position information of the specific position in the video captured by the first camera, wherein the specific position designated by the user operation is (a) a line segment for passage detection as the event detection or (b) a closed region for intrusion detection as the event detection; and
 setting for the second camera, based on (a) the obtained first position information of the specific position designated by the user operation in the video captured by the first camera and (b) the association between the coordinates on the video captured by the first camera and the coordinates on the video captured by the second camera, second position information of a specific position to be applied to an event detection in the video captured by the second camera.

\* \* \* \* \*